(12) United States Patent
Pegorier et al.

(10) Patent No.: US 10,766,365 B2
(45) Date of Patent: Sep. 8, 2020

(54) TRIM ELEMENT COMPRISING A SCREEN WITH TWO CONFIGURATIONS AND ASSOCIATED VEHICLE

(71) Applicant: Faurecia Interieur Industrie, Nanterre (FR)

(72) Inventors: Nicolas Pegorier, Parmain (FR); Rayar Fernandez, Beauvais (FR); Jérémy Floc'h, Allone (FR); Eric Vanel, Novillers (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 35 days.

(21) Appl. No.: 16/128,268

(22) Filed: Sep. 11, 2018

(65) Prior Publication Data

US 2019/0077264 A1    Mar. 14, 2019

(30) Foreign Application Priority Data

Sep. 11, 2017  (FR) ...................................... 17 58369

(51) Int. Cl.
*B60K 37/02*    (2006.01)
*B60K 37/04*    (2006.01)
*B60K 35/00*    (2006.01)
*B60R 13/02*    (2006.01)

(52) U.S. Cl.
CPC .............. *B60K 37/02* (2013.01); *B60K 35/00* (2013.01); *B60K 37/04* (2013.01); *B60R 13/0256* (2013.01); *B60K 2370/152* (2019.05); *B60K 2370/175* (2019.05); *B60K 2370/186* (2019.05); *B60K 2370/1868* (2019.05); *B60K 2370/52* (2019.05); *B60K 2370/67* (2019.05);

(Continued)

(58) Field of Classification Search
CPC ........ B60K 35/00; B60K 37/02; B60K 37/04; B60K 2370/152; B60K 2370/1526; B60K 2370/1529; B60K 2370/52; B60K 2370/67; B60R 11/0235; B60R 11/0241; B60R 13/02; B60R 13/0256
USPC .......................................................... 296/1.08
See application file for complete search history.

(56) References Cited

U.S. PATENT DOCUMENTS

| | | | |
|---|---|---|---|
| 9,688,146 B2 * | 6/2017 | Kim ....................... | B60K 35/00 |
| 2006/0131088 A1 | 6/2006 | Wolfgang et al. | |
| 2016/0121805 A1 * | 5/2016 | Forsgren ............. | B60R 11/0235 |
| | | | 348/837 |

FOREIGN PATENT DOCUMENTS

| | | | | |
|---|---|---|---|---|
| DE | 19609408 A1 | 9/1997 | | |
| DE | 202018101490 U1 * | 6/2018 | ............. | B60K 37/01 |
| EP | 1544040 A1 | 6/2005 | | |

(Continued)

OTHER PUBLICATIONS

English translation of DE 196 09 408; retreived on Jan. 16, 2016 via PatentTranslate located at www.epo.org. (Year: 2020).*

(Continued)

*Primary Examiner* — Jason S Daniels
(74) *Attorney, Agent, or Firm* — Reising Ethington P.C.

(57) ABSTRACT

A vehicle trim element including a body defining the shape of an outer surface and an information display system, the trim element being able to be positioned in a first configuration and in a second configuration, wherein the display system is moved along a first direction between the first configuration and the second configuration and in that the shape of the outer surface is modified between the first configuration and the second configuration.

20 Claims, 3 Drawing Sheets

(52) U.S. Cl.
CPC .. *B60K 2370/682* (2019.05); *B60K 2370/744* (2019.05); *B60R 2013/0287* (2013.01)

(56) References Cited

FOREIGN PATENT DOCUMENTS

JP        07277032 A  * 10/1995  ............. B60K 37/02
WO    WO-2007060352 A1 *  5/2007  ............. B60N 3/002

OTHER PUBLICATIONS

French Search Report corresponding to French application No. FR 1758369, dated Apr. 27, 2018, 2 pages.

* cited by examiner

TRIM ELEMENT COMPRISING A SCREEN WITH TWO CONFIGURATIONS AND ASSOCIATED VEHICLE

FIELD OF THE INVENTION

The present invention relates to a vehicle trim element including a body defining the shape of an outer surface and an information display system, the trim element being able to be positioned in a first configuration and in a second configuration.

BACKGROUND

Such a trim element is for example intended to be integrated into a vehicle, for example a motor vehicle, more particularly in the driver's station.

Document US 2006 0131088 A1 describes a screen arranged on the front of the dashboard. The screen is movable along a horizontal direction of the dashboard. This in particular allows the driver or front passenger to move the screen to see it better.

However, in such a configuration, the surface of the dashboard facing the passenger compartment is partially hidden by the screen. More particularly here, the surface of a CD player is hidden by the screen when the latter is in the extreme position closest to the driver.

Furthermore, the screen protrudes relative to the dashboard, which is not esthetically satisfactory.

SUMMARY

One aim of the invention is to allow optimal integration of the screen within the rest of the trim element in all possible configurations.

To that end, the invention relates to a trim element of the aforementioned type, wherein the display system is movable along a first direction between the first configuration and the second configuration and in that the shape of the outer surface is modified (changes) between the first configuration and the second configuration.

The movement of the display system according to the first configuration and the second configuration for example makes it possible to adapt the environment to different situations. For example, such a trim element is particularly suitable for the so-called manual driver's station of an autonomous vehicle, the first configuration being provided in the context of a driving position and the second configuration while the vehicle is in so-called autonomous driving mode, in which the intervention of a driver is not necessary to steer the vehicle.

Furthermore, the modification of the shape of the outer surface makes it possible to adapt the trim element for better integration of the screen into the element. More particularly, it for example makes it possible to make zones of the display system visible or emphasize them depending on the chosen configuration.

According to specific embodiments, the trim element of the invention may have one or more of the following optional features, considered alone or according to any technically possible features:

the display system is moved along a second direction, different from the first direction, between the first configuration and the second configuration, such that the surface of the display system visible in the second configuration is larger than the surface of the display system visible in the first configuration, the display system moves from a position close to an extreme part of the outer surface to a position substantially at the center of the trim element along the first direction between the first configuration and the second configuration, the outer surface has a basin shape, the basin moving from a position close to an extreme part of the outer surface to a position substantially at the center of the trim element along the first direction between the first configuration and the second configuration, the outer surface has a basin shape having a bottom, the dimension of the bottom along the first direction increasing between the first configuration and the second configuration, the display system has a single screen, information relative to the driving of the vehicle is displayed on the information display system in the first configuration, the display system, in the second configuration, has no zone arranged to display information related to driving, the shape of the outer surface delimits part of the contour of the information display system.

The invention further relates to a vehicle including a trim element as described above.

BRIEF DESCRIPTION OF THE DRAWINGS

The invention will be better understood upon reading the following description, provided solely as a non-limiting example and done in reference to the appended drawings, in which.

DETAILED DESCRIPTION

Figure 1:
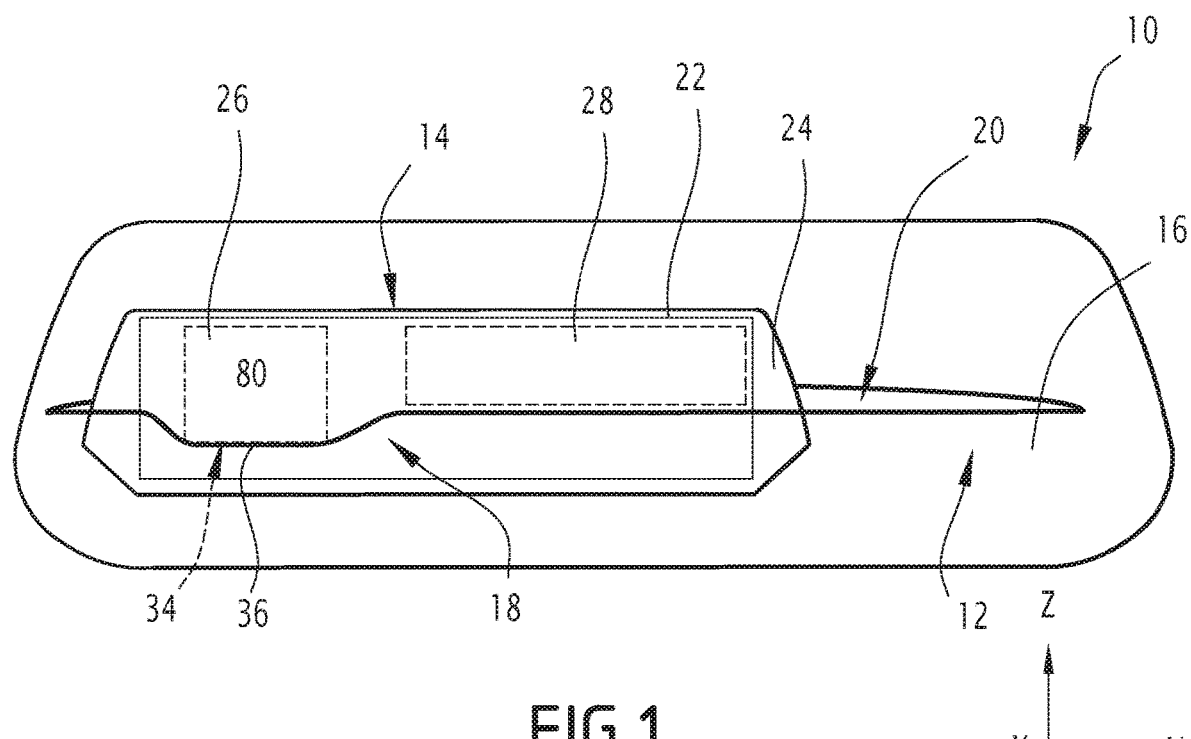
FIG. 1 is a perspective schematic view of a trim element according to one embodiment of the invention in a first configuration.
Figure 2:
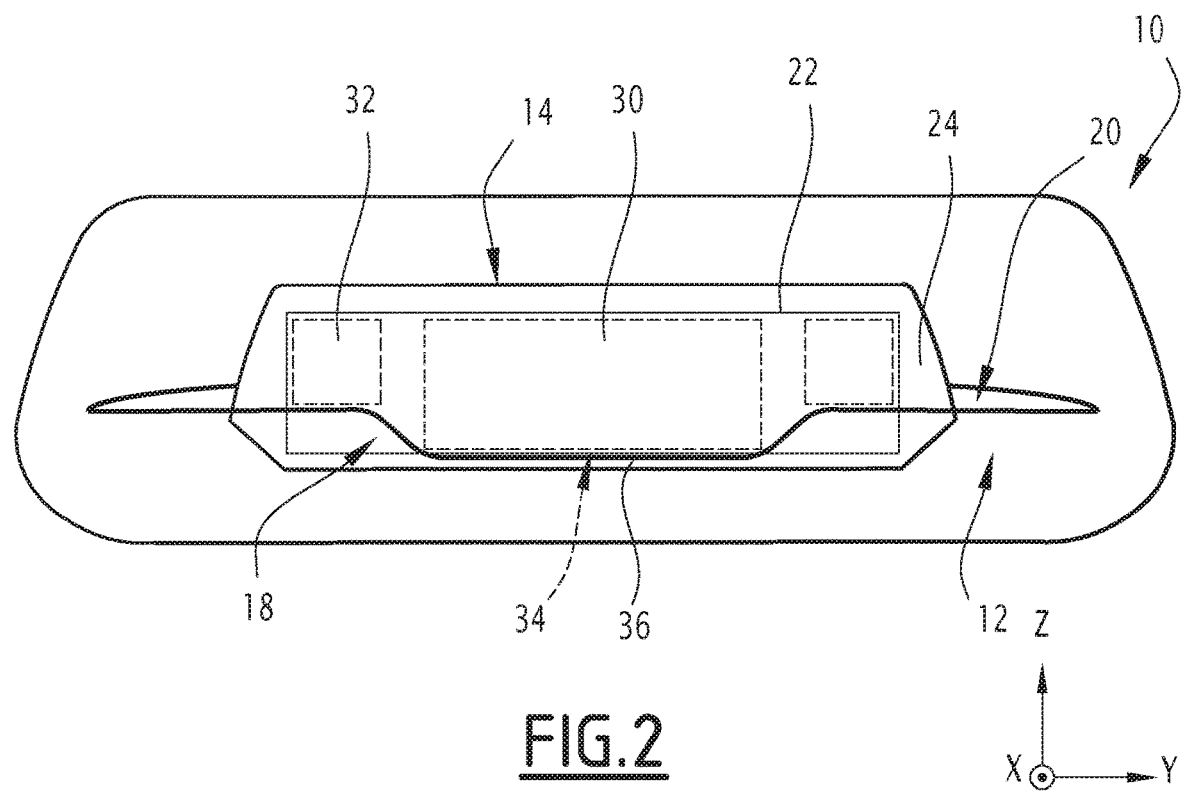
FIG. 2 is a schematic perspective view of the trim element of FIG. 1 in a second configuration.

An example trim element 10 is shown in FIGS. 1 and 2.

The trim element 10 is for example integrated into a vehicle, more particularly into a driver's station of a vehicle, and for example forms a dashboard of the vehicle. The invention is, however, suitable for the trim of other parts of the passenger compartment of the vehicle, such as a door, a seat or the like.

An elevation direction Z is defined, for example, in the usual direction in a vehicle, i.e., the direction perpendicular to the rolling plane of the vehicle in which the trim element is intended to be installed. The terms "top" and "bottom" are defined in the elevation direction in the usual way.

The longitudinal X and transverse Y directions are also defined perpendicular to the elevation direction Z in the usual way in a vehicle. The expressions "front" and "rear", "left" and "right" will be used hereinafter relative to the normal movement direction of the vehicle.

The trim element 10 includes a body 12 and an information display system 14.

The body 12 defines the shape of an outer surface 16 of the trim element 10, i.e., the visible surface of the trim element 10, for example from the passenger compartment of the vehicle in which the trim element 10 is installed. It is understood that the outer surface 16 follows the shape of a surface of the body 12. In other words, the outer surface 16 can be formed by the body 12 or by a decorative layer extending over the body 12 and adopting the shape of a surface of the body 12.

The body 12 is for example a vehicle dashboard body or a door panel or the like.

At least one zone 18 of the body 12 is deformable under the effect of an actuation, such that the shape of the outer surface 16 can be changed in the deformable zone 18. According to one embodiment, the body 12 is made deformable by the material from which the deformable zone is made, for example a resilient material. According to another embodiment, the deformation may be obtained by inflating an inflatable element inserted between the body and a decorative layer extending over the body.

Figure 5:
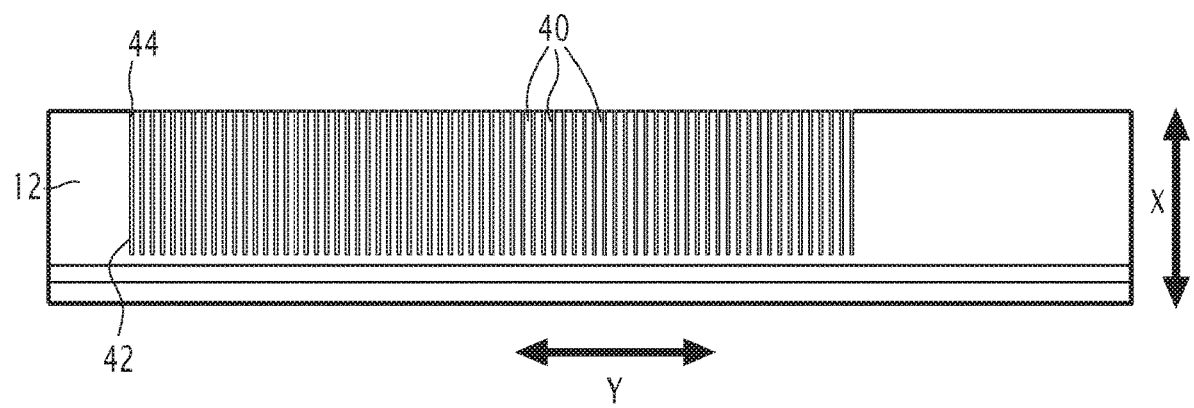
FIG. 5 is a schematic top view of the body.

The deformable zone 18 is for example obtained by a series of strips 40 formed in the body 12 each extending along the longitudinal direction X, as shown in FIG. 5. The strips 40 are adjacent to one another in the transverse direction Y and form a part of the surface of the body defining the outer surface 16 of the trim element. Each strip 40 is for example cut in the body 12 and includes a first end 42 secured to the rest of the body and a second free end 44, forming part of a transverse edge of the body 12. Due to its shape, each strip 40 is deformable relative to the rest of the body in a second elevation direction Z, for example by rotation around a transverse axis passing near the first end. Thus, by exerting pressure on the second free end 44, it is possible to move the strip 40 relative to the rest of the body, such that it extends in a different plane from the rest of the surface of the body when it is deformed. The series of strips 40 along the transverse direction forms a guide surface.

Two actuating elements 46 cooperate with the strips 40 in order to deform the latter and create the desired shapes in the outer surface of the trim element.

More particularly, each actuating element 46 includes an actuating segment extending non-rectilinearly in the transverse direction Y. The actuating segment cooperates with the guide surface in an actuating zone such that the guide surface adopts the shape of the actuating segment in said actuating zone. The actuating segment is movable relative to the body 12 along the transverse direction such that the actuating zone is movable and the outer surface 16 of the body 12 deforms when the actuating element is moved along the transverse direction Y relative to the body 12.

Figure 3:
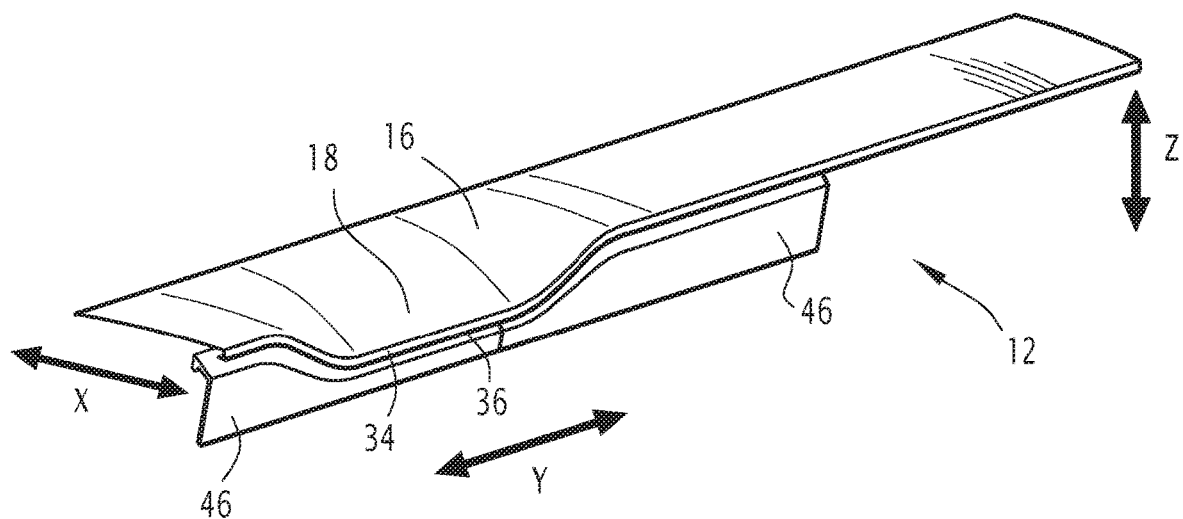
FIG. 3 is a schematic perspective view of the body in the first configuration.

According to this embodiment, which is provided solely as an example, the actuating elements are such that the actuating elements 46 are adjacent to one another, in a close position, the deformed zone of the outer surface has, between the actuating zones, a basin shape 34 whereof the bottom 36 extends in the actuating zones, as shown in FIG. 3.

By moving the two actuating elements in a coordinated manner such that they stay adjacent to one another, it is possible to move the basin in the transverse direction Y.

Figure 4:
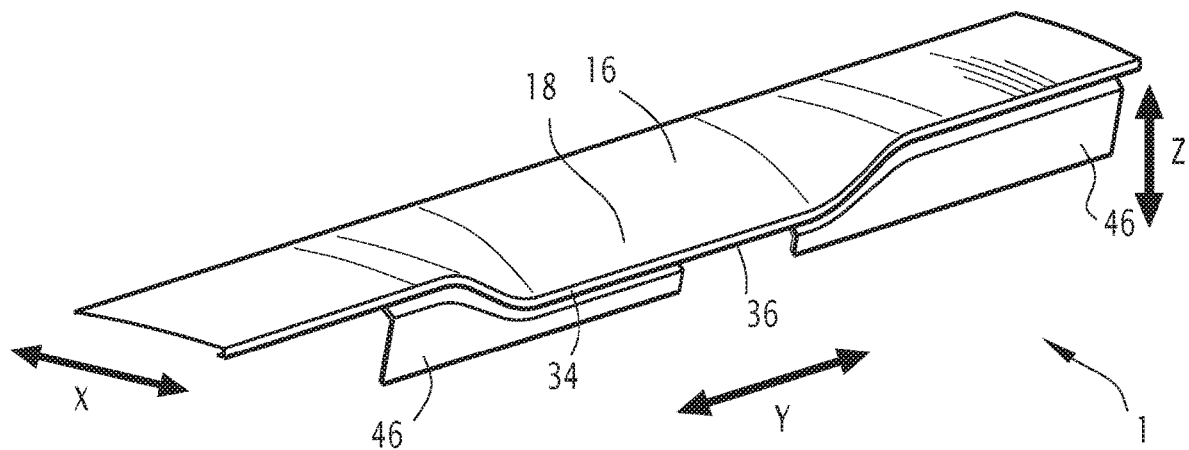
FIG. 4 is a schematic perspective view of the body in the second configuration.

It is also possible to enlarge the dimensions of the bottom 36 of the basin 34 by moving the actuating elements 46 independently of one another so as to move them away from one another. Due to the stresses applied by the actuating segment on the guide surface, the part of the guide surface extending between the two actuating zones remains deformed even though this part does not cooperate with the actuating elements 46, as shown in FIG. 4.

It will be noted that the deformed zone retains a certain rigidity, since it is bearing on the actuating element, which is rigid. Thus, the feel and the mechanical strength of the outer surface are substantially the same over the entire surface, including in the deformed zone.

The body 12 also has a slot 20 extending perpendicularly along a first direction, corresponding in the illustrated example to the transverse direction Y.

Alternatively, the first direction is curved.

The slot 20 is hollowed out substantially along a second direction, here corresponding to the elevation direction Z relative to the outer surface 16. The slot 20 here extends in front of the deformable zone 18, such that the deformable zone 18 at least partially defines one side of the slot 20.

The thickness of the slot 20 is defined as the dimension of the slot along the direction perpendicular to the first and second directions Z. Said thickness is for example variable along the first direction.

The display system 14 is arranged in the slot 20 of the body 12.

The display system 14 extends primarily along the first and second directions.

In the illustrated embodiment, the display system 14 is substantially flat.

In an alternative embodiment in which the first direction is curved, the display system 14 is curved.

The display system 14 includes at least one screen 22, more particularly a single screen.

The screen 22 has a viewing surface extending along the first and second directions and on which an image is visible.

A thickness of the screen is defined perpendicular to the viewing system, as well as a width along the first direction and a height along the second direction.

The screen 22 is arranged in the slot 20 along its thickness, i.e., the thickness of the screen 22 extends along the thickness of the slot 20.

The screen 22 extends over a rear face 24 of the display system 14, more particularly across from the passenger compartment of the vehicle.

The screen 22 extends over at least 80% of the rear face of the display system 14. In one embodiment, the screen 22 extends over all of the rear face of the display system 14.

The deformable zone 18 extends across from the screen 22, between the screen 22 and the passenger compartment, such that the deformable zone 18 partially hides the screen from the passenger compartment.

The trim element 10 is able to be positioned in a first configuration visible in FIG. 1 and in a second configuration visible in FIG. 2.

The display system 14 is moved along the first direction between the first configuration and the second configuration. More particularly, the display system 14 is moved by sliding in the slot 20 of the body 12.

The display system 14 is translated in the first direction.

In the illustrated embodiment, at least part of the screen 22, in particular the viewing surface, is always visible. More particularly, at least 30% of the surface of the screen is always visible along the second direction, more specifically an upper part of the screen along the second direction. In one particular embodiment, the screen is visible along the entire width of the screen 22 over said part.

The nonvisible part of the screen 22 is hidden by the outer surface 16 of the trim element 10.

When the first configuration is a manual driving configuration, in which the driver performs the driving of the vehicle, the display system 14 is in a position close to an extreme transverse part of the outer surface 16 in the first configuration. More particularly, the display system 14 is close to one of the ends of the slot 20.

In the case of a dashboard, the display system 14 is arranged at least across from the driver in the first configuration.

Information relative to the driving of the vehicle is displayed on at least part of the information display system 14 in the first configuration.

In the first configuration, the information display system 14 more particularly displays the dashboard instruments such as speed, fuel level and/or engine revolution counter. This in particular allows the driver to clearly view the information useful for driving. More particularly, the display system has at least one first display zone 26 for information relative to driving and at least one second display zone 28 for entertainment. The first display zone 26 is provided across from the driver, while the second display zone 28 extends substantially at the center of the trim element 10 along the first direction.

The second display zone 28 has a size and location such that it does not bother the driver when driving.

In the second configuration, the display system 14 is substantially at the center of the trim element 10 along the first direction.

The display system 14, in the second configuration, has no zone arranged to display information related to driving, Alternatively, the display system 14 displays information related to driving, this representing less than 25% of the viewable surface of the display system 14.

More particularly, in the second configuration, the display system 14 has a primary zone 30, more particularly for entertainment, for example extending over at least 60% of the surface of the screen.

The primary zone 30 in the second configuration has a surface strictly larger than that of the second display zone 28 in the first configuration.

In the illustrated example, the display system 14 further has two secondary zones 32 in the second configuration, the secondary zones 32 extending on either side of the primary zone 30 along the first direction.

The display system 14 is further also moved along the second direction between the first configuration and the second configuration, such that the surface of the display system, more particularly the viewing system, visible in the second configuration is larger than the surface of the display system, more particularly the viewing surface, visible in the first configuration.

Figure 6:
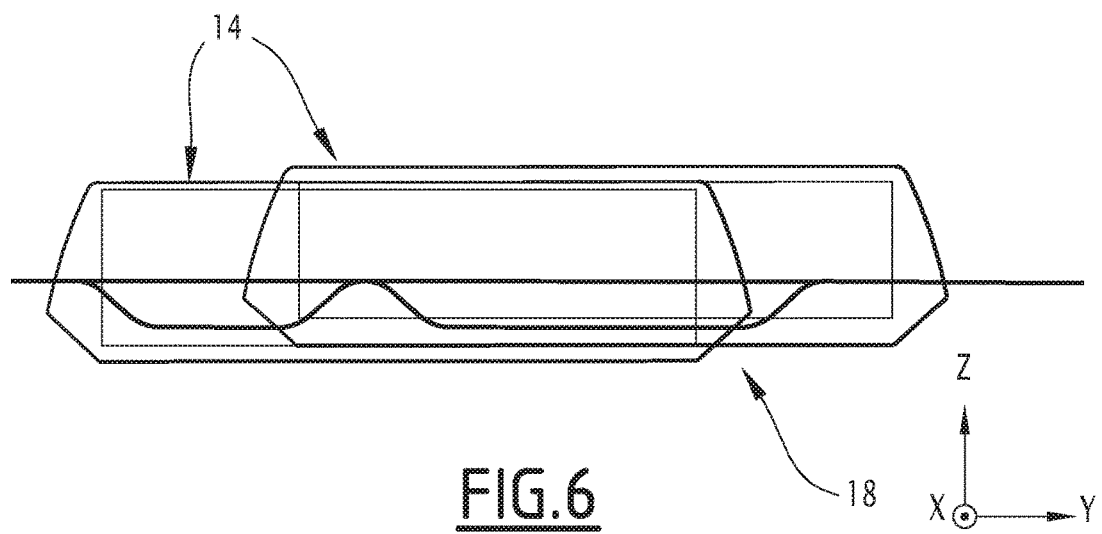
FIG. 6 is a schematic view of part of the trim element in the first configuration and the second configuration.

The display system 14 in the second configuration is higher along the second direction relative to the body 12 than the display system in the first configuration, as shown in FIG. 6, for example by a distance comprised between 10 mm and 150 mm, more particularly between 25 mm and 100 mm.

The slot 20 for example has a bottom that is domed at the center along the first direction, such that when the display system 14 moves in the slot 20, it also moves along the second direction.

Furthermore, the shape of the outer surface 16 is modified (changes) between the first configuration and the second configuration, more particularly in the deformable zone of the body 12.

The outer surface 16 has a basin shape 34, more particularly along the first direction, as previously described in the example embodiment of the deformable zone 18, in which the transverse direction Y corresponds to the first direction, the elevation direction Z corresponds to the second direction and the longitudinal direction X corresponds to a third direction.

The basin 34 is arranged across from at least one portion of the display system 14, more particularly across from the primary zone 30, along a direction perpendicular to the first direction.

The basin shape has a bottom 36.

In the first configuration, the basin 34 is in a position close to a transverse end part of the outer surface 16.

More particularly, the basin 34 is arranged at the first display zone 26. In the case of a dashboard, the basin 34 is arranged across from the driver. This in particular makes it possible to highlight the information displayed on the screen 22 across from the driver that may be useful for driving.

In the second configuration, the basin 34 is in a position substantially at the center of the trim element 10 along the first direction.

More particularly, the basin 34 is arranged at least in line with the primary display zone 30 of the display system 14. This in particular makes it possible to increase the surface area of the screen visible from the passenger compartment.

The size of the bottom 36 of the basin 34 along the first direction increases between the first configuration and the second configuration. In the first configuration, the size of the bottom 36 of the basin 34 along the first direction is comprised between 150 and 300 mm, whereas in the second configuration, it is comprised between 400 and 600 mm.

The movement of the display system 14 makes it possible to adapt the environment of the vehicle depending on a user's needs.

Such a trim element may be intended for the driver's station of an autonomous vehicle, the first configuration being provided in the context of a driving position and the second configuration while the vehicle is in autonomous mode. Thus, the display system adapts the display zones and the displayed information based on the needs.

Furthermore, the deformation of the outer surface makes it possible to integrate the display system dynamically into the trim element.

It is understood that the display system 14 and the outer surface 16 may be positioned in other configurations in order to adapt the position of the display system 14 and the shape of the outer surface 16 precisely to the choices of the occupants of the vehicle, for example to bring the display system 14 closer to the front passenger of the vehicle and/or to adapt the shape of the outer surface 16 in order to draw the attention of the occupants of the vehicle to a particular zone of the display system 14.

The invention claimed is:

1. A vehicle trim element including a body defining the shape of an outer surface and an information display system, the trim element being able to be positioned in a first configuration and in a second configuration,
    wherein, when the display system is moved along a first direction between the first configuration and the second configuration, the shape of the outer surface changes between the first configuration and the second configuration, and
    wherein the outer surface has a basin shape having a bottom, a dimension of the bottom along the first direction increasing between the first configuration and the second configuration.

2. The trim element according to claim 1, wherein the display system is movable along a second direction, different from the first direction, between the first configuration and the second configuration, such that an amount of a surface of the display system visible in the second configuration is larger than an amount of the surface of the display system visible in the first configuration.

3. The trim element according to claim 1, wherein the display system moves from a position close to an extreme part of the outer surface to a position substantially at a center of the trim element along the first direction between the first configuration and the second configuration.

4. The trim element according to claim 1, wherein the outer surface has a basin shape, the basin shape moving from a position close to an extreme part of the outer surface to a position substantially at a center of the trim element along the first direction between the first configuration and the second configuration.

5. The trim element according to claim 1, wherein the display system has a single screen.

6. The trim element according to claim 1, wherein information relative to the driving of the vehicle is displayed on the information display system in the first configuration.

7. The trim element according to claim 1, wherein the display system, in the second configuration, has no zone arranged to display information related to driving.

8. The trim element according to claim 1, wherein the shape of the outer surface delimits part of a contour of the information display system.

9. A vehicle including the trim element according to claim 1.

10. A vehicle trim element including a body defining the shape of an outer surface and an information display system, the trim element being able to be positioned in a first configuration and in a second configuration,
   wherein, when the display system is moved along a first direction between the first configuration and the second configuration, the shape of the outer surface changes between the first configuration and the second configuration, and
   wherein the display system moves from a position close to an extreme part of the outer surface to a position substantially at a center of the trim element along the first direction between the first configuration and the second configuration.

11. The trim element according to claim 10, wherein the display system is movable along a second direction, different from the first direction, between the first configuration and the second configuration, such that an amount of a surface of the display system visible in the second configuration is larger than an amount of the surface of the display system visible in the first configuration.

12. The trim element according to claim 10, wherein information relative to the driving of the vehicle is displayed on the information display system in the first configuration.

13. The trim element according to claim 10, wherein the display system, in the second configuration, has no zone arranged to display information related to driving.

14. The trim element according to claim 10, wherein the shape of the outer surface delimits part of a contour of the information display system.

15. A vehicle including the trim element according to claim 10.

16. A vehicle trim element including a body defining the shape of an outer surface and an information display system, the trim element being able to be positioned in a first configuration and in a second configuration,
   wherein, when the display system is moved along a first direction between the first configuration and the second configuration, the shape of the outer surface changes between the first configuration and the second configuration, and
   wherein the outer surface has a basin shape, the basin shape moving from a position close to an extreme part of the outer surface to a position substantially at a center of the trim element along the first direction between the first configuration and the second configuration.

17. The trim element according to claim 16, wherein the display system is movable along a second direction, different from the first direction, between the first configuration and the second configuration, such that an amount of a surface of the display system visible in the second configuration is larger than an amount of the surface of the display system visible in the first configuration.

18. The trim element according to claim 16, wherein information relative to the driving of the vehicle is displayed on the information display system in the first configuration.

19. The trim element according to claim 16, wherein the display system, in the second configuration, has no zone arranged to display information related to driving.

20. The trim element according to claim 16, wherein the shape of the outer surface delimits part of a contour of the information display system.

* * * * *